United States Patent
Caviedes

(10) Patent No.: US 7,362,377 B2
(45) Date of Patent: Apr. 22, 2008

(54) SPATIO-TEMPORAL ADAPTIVE VIDEO DE-INTERLACING

(75) Inventor: Jorge E. Caviedes, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 567 days.

(21) Appl. No.: 11/022,625

(22) Filed: Dec. 27, 2004

(65) Prior Publication Data

US 2006/0139486 A1 Jun. 29, 2006

(51) Int. Cl.
 *H04N 7/01* (2006.01)
 *H04N 11/20* (2006.01)

(52) U.S. Cl. .................. 348/452; 348/448; 348/458

(58) Field of Classification Search ........ 348/448–452, 348/458, 441, 699, 700
See application file for complete search history.

(56) References Cited

U.S. PATENT DOCUMENTS

| | | | |
|---|---|---|---|
| 5,410,356 A * | 4/1995 | Kikuchi et al. | 348/452 |
| 5,943,099 A | 8/1999 | Kim | |
| 5,959,681 A | 9/1999 | Cho | |
| 6,509,930 B1 * | 1/2003 | Hirano et al. | 348/452 |
| 6,606,126 B1 * | 8/2003 | Lim et al. | 348/452 |
| 7,224,399 B2 * | 5/2007 | Song | 348/452 |
| 2003/0011709 A1 | 1/2003 | Kasahara et al. | |
| 2004/0189866 A1 | 9/2004 | Lin et al. | |

FOREIGN PATENT DOCUMENTS

EP 1 039 746 A2 9/2000

OTHER PUBLICATIONS

Tero Koivunen, "Motion Detection of an Interlaced Video Signal", IEEE Transactions on Consumer Electronics, vol. 40, No. 3, Aug. 1, 1994, pp. 753-759, XP000471245, ISSN: 0098-3063.
"PCT Internatinal Search Report", mailed Apr. 23, 2007, for PCT/US2005/047590, 4 pgs.

* cited by examiner

*Primary Examiner*—M. Lee
(74) *Attorney, Agent, or Firm*—Buckley, Maschoff & Talwalker LLC

(57) ABSTRACT

A method includes storing a current field of a digital video signal. The method further includes storing a preceding field that immediately precedes the current field in the digital video signal, and storing a succeeding field that immediately succeeds the current field in the digital video signal. The method also includes examining the preceding and succeeding fields for motion at a locus of a current pixel to be interpolated. In addition, if any motion at the locus is less than a threshold, the preceding and succeeding fields are examined for motion at a respective locus of at least one pixel that is adjacent to the current pixel to be interpolated.

18 Claims, 8 Drawing Sheets

SPATIO-TEMPORAL ADAPTIVE VIDEO DE-INTERLACING

BACKGROUND

For a variety of applications, it is necessary to convert conventional interlaced video signal frames into a progressive scan format. For example, it may be necessary to convert an interlaced signal received over the air into a progressive scan format for display on a digital video monitor.

A number of de-interlacing techniques have been proposed. In one technique, motion detection is applied at the point where interpolation is occurring. If there is no motion, a "weave" approach is applied in which the pixel value to be generated is taken from the corresponding pixel in the preceding field. If there is motion at the current point, a "bob" approach is applied in which the pixel value to be generated by interpolation is obtained by interpolating the neighboring pixels from the lines (in the current field) above and below the pixel to be generated.

In another proposed technique, the pixel value to be generated is obtained as a weighted average of the pixel values that would be obtained by the "bob" and "weave" approaches, and the weights applied to the bob and weave pixel values vary depending on the degree of motion.

The above techniques may result in less than satisfactory image quality since combing artifacts, degradation of diagonal edges and "ghosts" may be produced by these techniques.

DETAILED DESCRIPTION

Figure 1:
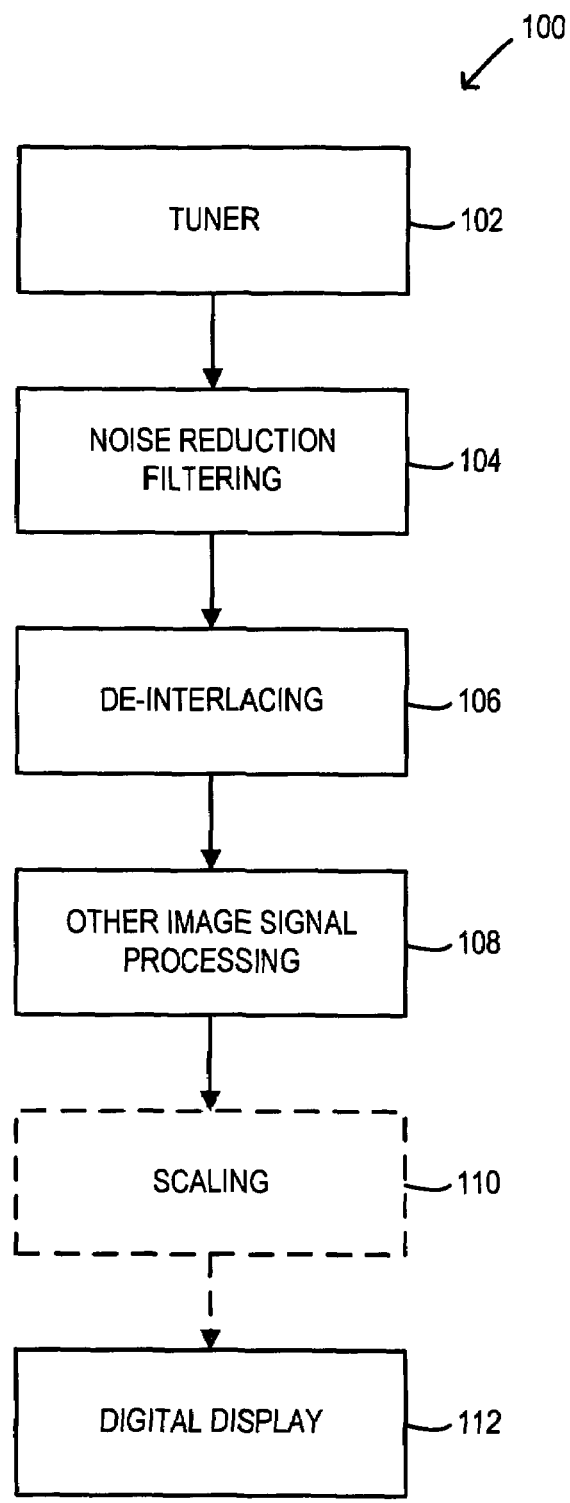
FIG. 1 is a block diagram of an apparatus which performs a de-interlacing process in accordance with some embodiments.

FIG. 1 is a block diagram of an apparatus 100 which performs a de-interlacing process in accordance with some embodiments.

The apparatus 100 includes a tuner 102 or other source of interlaced video signal. Though not separately shown, the tuner 102 may include, if necessary, suitable circuitry for converting the interlaced video signal into a digital interlaced video signal.

The apparatus 100 may also include a noise reduction filtering block 104 which is coupled to the tuner 102 and which performs noise reduction filtering on the digital signal provided by the tuner 102.

In addition, the apparatus 100 includes a de-interlacing process block 106 which is coupled to the noise reduction filtering block 104 and which performs de-interlacing of the digital video signal in accordance with some embodiments. (It will be appreciated that the de-interlacing process block 106 may be considered to be coupled to the tuner 102 via the noise reduction filter block 104.)

Further, the apparatus 100 may include one or more other image signal processing blocks (indicated at 108) to perform one or more other processes on the de-interlaced video signal, such as sharpness enhancement, color correction, gamma correction, etc.

The apparatus 100 may also include a scaling block 110 (shown in phantom) to perform resizing of the image for display on a digital display component 112, which is also included in the apparatus 100.

Except for the de-interlacing process block 100, the components of the apparatus 100 may be configured and may operate in accordance with conventional practices.

Figure 2:
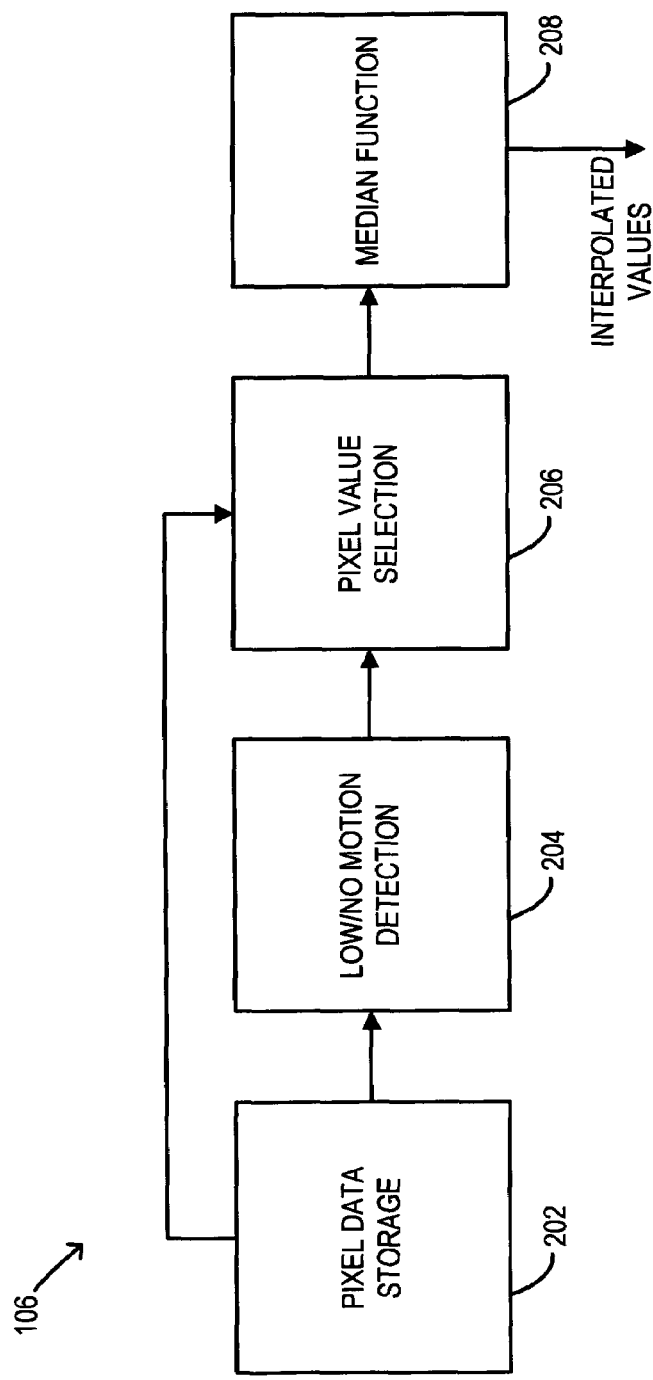
FIG. 2 is a block diagram which illustrates aspects of a de-interlacing component of the apparatus of FIG. 1.

FIG. 2 is a block diagram which illustrates aspects of the de-interlacing process block 106. Block 202 in FIG. 2 represents one or more storage devices to store image data (pixel value data) that represents a number of fields (or frames, after de-interlacing has been performed relative to a field) of the digital video signal. For example, in addition to storing the pixel values for the current field that is being de-interlaced, the storage block 202 may also store the field ("preceding field") which immediately precedes the current field in the digital video signal (together with interpolated values that have been generated for the missing lines of the preceding field during de-interlacing thereof), as well as the field ("succeeding field") which immediately succeeds the current field in the digital video signal.

Block 204 in FIG. 2 represents a circuit block which detects motion between two of the fields stored in the storage block 202. For example, the motion detection block 204 may detect a condition of low or no motion between the preceding and succeeding fields at a locus or loci that are relevant to a pixel location in the current field, where the pixel location in the current field is the location for which an interpolation operation is being performed.

Block 206 in FIG. 2 represents a circuit block which selects sets of pixel values from one or more of the preceding, current and succeeding fields in response to results of the motion detection operations of the motion detection block 204. The sets of pixel values selected by circuit block 206 may be provided as inputs to a median function block 208 which provides as an output the median value of the input set of pixel values. The median value output from median function block 208 may, with or without further processing, be provided as an interpolated value for the pixel location (in the current field) that is currently being subjected to de-interlacing processing (i.e., to interpolation).

Figure 3:
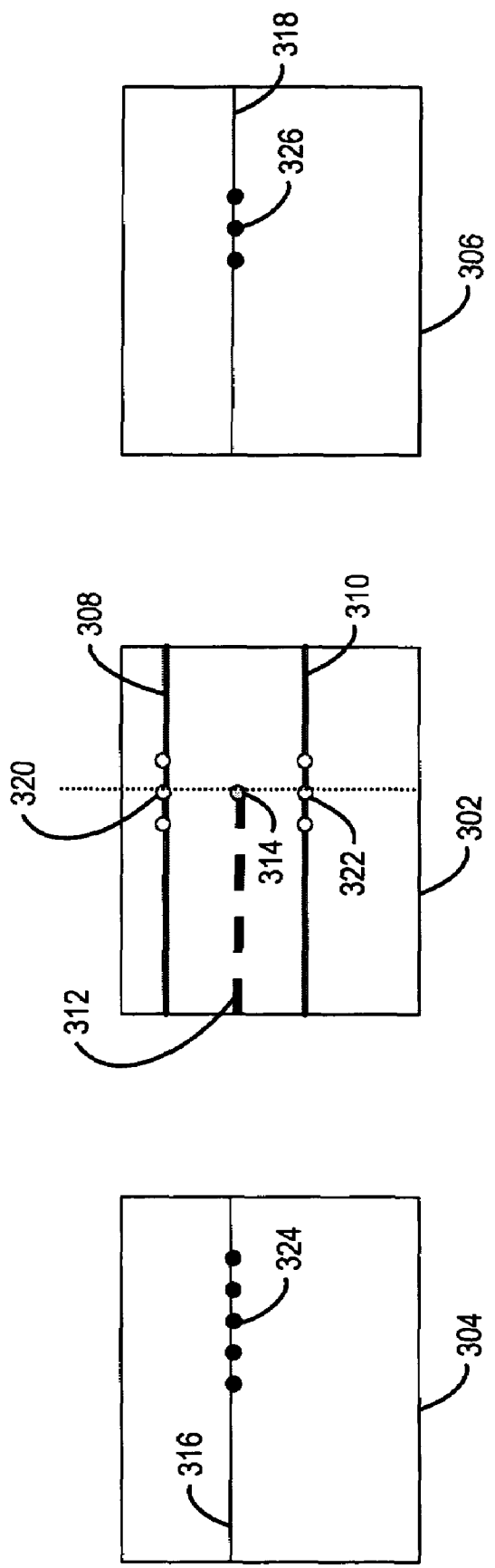
FIG. 3 is a schematic illustration of spatially and temporally neighboring pixels of a pixel to be interpolated.

FIG. 3 is a schematic illustration of spatially and temporally neighboring pixels of a pixel to be interpolated. More specifically, reference numeral 302 indicates the current field, which is the field to which de-interlacing processing is being applied. Without loss of generality, it will be assumed that the current field 302 is made up of the even lines of a video signal frame, and lacks odd lines, so that the purpose of the de-interlacing process is to generate interpolated values for the pixels which are to make up the missing odd lines in current field 302. It follows that the preceding field 304 and the succeeding field 306 are made up of odd lines and lack even lines. For simplicity of illustration all but two of the lines of the current field 302 are omitted. The two lines 308, 310 of current field that are shown are neighbors of each other, and the dashed line 312 partially shown therebetween represents the intervening odd line that is currently being generated by interpolation. In particular, pixel location 314 is the locus of the pixel in line 312 that is currently to be generated by interpolation. Thus pixel location 314 corresponds to the current pixel to be interpolated.

Again to simplify the illustration, the only line of preceding field 304 that is shown is the line 316 which corresponds in position to the current (being interpolated) line 312 of the current field 302, and the only line of the succeeding field 306 that is shown is the line 318 which corresponds in position to the current line 312 of the current field 302.

In some embodiments, up to 14 pixel values of the fields 302, 304, 306 may potentially be considered and/or directly used in generating the interpolated pixel value for the current pixel 314. These 14 pixel values may include three from line 308 of current field 302, three from line 310 of current field 302, five from line 316 of preceding field 304 and three from line 318 of succeeding field 306. More specifically, the three pixel values from line 308 may include the pixel 320 which is immediately above the current pixel location 314 plus the two pixels immediately to the left and right of pixel 320; the three pixel values from line 310 may include the pixel 322 which is immediately below the current pixel location 314 plus the two pixels immediately to the left and right of pixel 322; the five pixel values from line 316 may include the pixel 324 which corresponds in location to the current pixel 314 (i.e., is in the same location in line 316 that pixel 314 is in in line 314) plus the two pixels immediately to the left of pixel 324 plus the two pixels immediately to the right of pixel 324; and the three pixel values from line 318 may include pixel 326 which corresponds in location to the current pixel 314 plus the two pixels immediately to the left and right of pixel 326.

Figure 4:
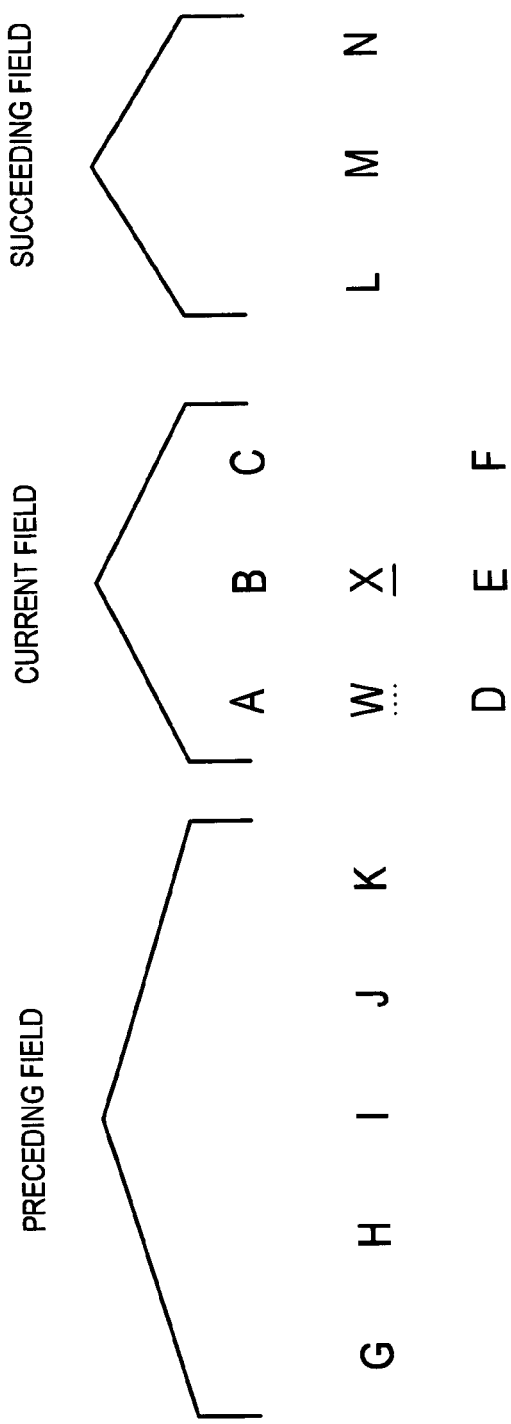
FIG. 4 is another schematic illustration of the locus of the pixel to be interpolated and the neighboring pixels.

FIG. 4 is a further schematic representation of the current pixel and the fourteen pixels potentially considered and/or used in interpolating the current pixel in the process to be described below in connection with FIGS. 5A-5B. In FIG. 4, X (underlined) represents the locus of the current pixel to be interpolated. A, B and C represent the three pixels from line 308 (the line in the current field above the current pixel). D, E and F represent the three pixels from line 310 (the line in the current field below the current pixel). G, H, I, J and K represent the five pixels from line 316 (the line in the preceding field which corresponds to the current line being interpolated in the current field). L, M and N represent the three pixels from line 318 (the line in the succeeding field which corresponds to the current line being interpolated in the current field). (The pixel location indicated at W is not pertinent to the process of FIGS. 5A-5B.)

Figure 5A:
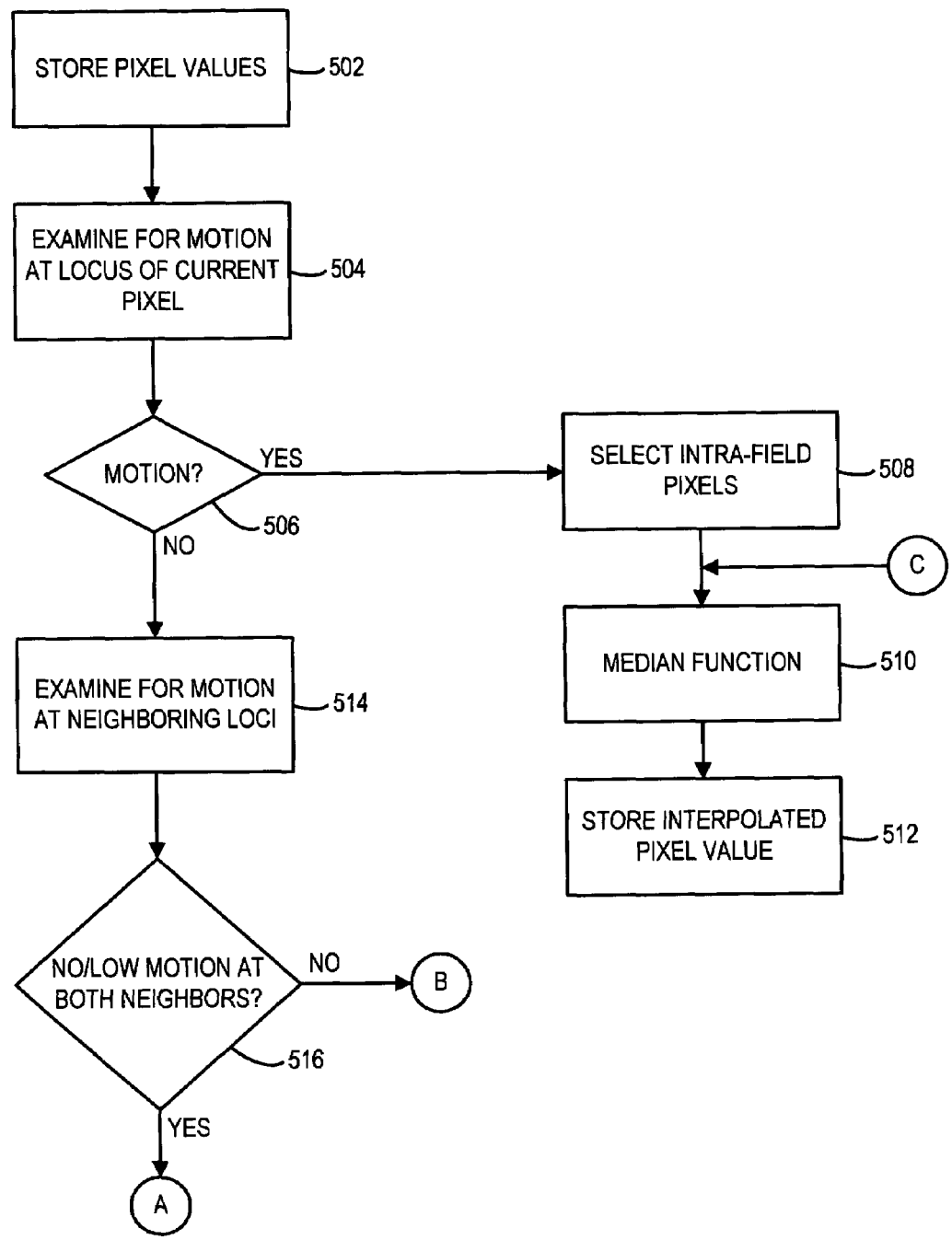
FIGS. 5A and 5B together form a flow chart that illustrates a de-interlacing process provided according to some embodiments.
Figure 5B:
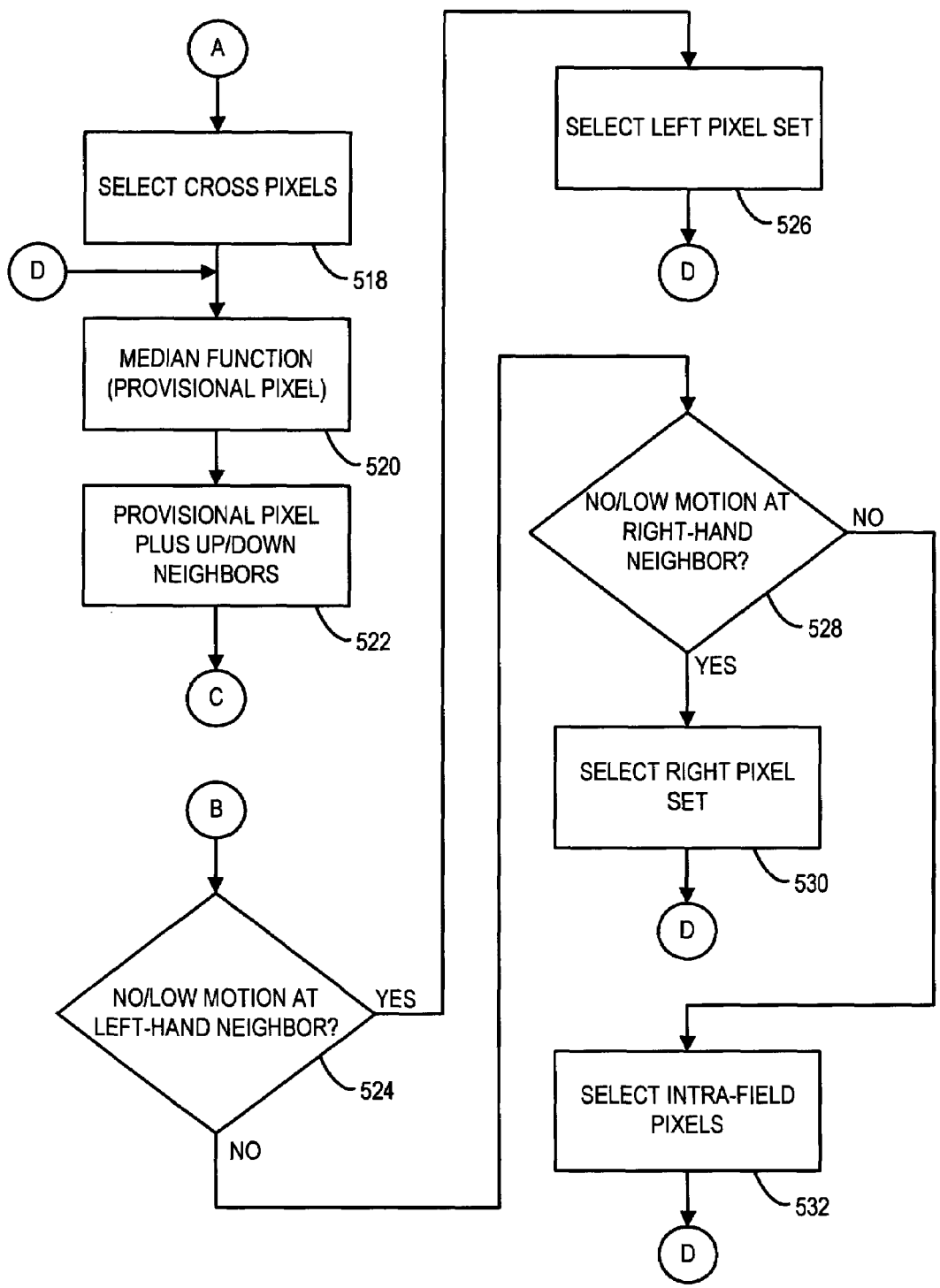

The process of FIGS. 5A-5B begins at 502, at which the necessary input pixel values are stored. This may include storing all of the input values for the preceding, current and succeeding fields or at least storing the fourteen pixel values represented at A-N in FIG. 4. (It will be appreciated that, in any case, all input pixel values of all three fields are eventually stored.)

Then, at 504, the preceding and succeeding fields are examined at the locus of the current pixel to determine whether there is motion in the video signal at that locus. For example, the absolute value of the difference between pixel values I and M may be compared with a threshold, and if that absolute value is less than the threshold, then it may be concluded that there is either no motion or that the amount of motion is relatively low. In some embodiments, the pixel values may be defined in a range 0-255 and the threshold for the no/low motion determination may be 10. (Where there is either no motion at a locus, or there is motion at the locus that is less than a threshold, then it can be said that the following condition is met: "any motion at the locus is less than the threshold".)

At decision block 506 it is determined whether there is significant motion at the locus of the current pixel (i.e., whether the motion, if any, equals or exceeds the threshold). If significant motion is found to be present, then (as indicated at 508) a set of nearest neighbor pixels from the current field is selected. For example, pixel values A, B, C, D, E and F are selected. The set of pixel values selected at 508 are then provided as inputs to a median function (510 in FIG. 5A), which outputs the median value of the set of selected pixel values. Immediately or after further processing, the output median value may be considered to be the interpolated value of the current pixel, and stored as such, as indicated at 512. (In some embodiments, rounding to the nearest integer may be applied to the median value. Moreover, in some embodiments, every output of a median function may be subjected to rounding to the nearest integer. This may be desirable since the output of a median function, when it has an even number of arguments, may be the arithmetic mean of the two center values.)

If it is determined at 506 that any motion at the locus of the current pixel is less than the threshold, then (as indicated at 514) the preceding and succeeding fields are examined for motion at the respective loci of the pixel locations that are adjacent to the current pixel in the current line (i.e., at the pixel locations that immediately precede and succeed the current pixel in the horizontal line that includes the current pixel). For example, the absolute value of the difference between pixels H and L may be compared with a threshold (which may, but need not, be the same as the threshold employed at 504), and the absolute value of the difference between pixels J and N may be compared with a threshold (which may, but need not, be the same as the threshold employed at 504).

At decision block 516, it is determined whether both of the adjacent pixel locations exhibit no motion or low motion. If there is low or no motion at both adjacent pixel locations, then a spatio-temporal "cross" pattern of nearest neighbors may be selected, as indicated at 518 (FIG. 5B). For example, the pixel values B, E, I and M may be selected at 518. The set of pixel values selected at 518 are then provided as inputs to a median function (520 in FIG. 5B), which outputs the median value of the input pixel value set. Immediately or after further processing, the output median value obtained at 520 may be considered to be a "provisional" pixel value. (In some embodiments, rounding to the nearest integer may be applied to the median value.) Then, the provisional pixel value plus the pixel values B and E may be supplied (as indicated at 522) as the pixel value input set to the median function at 510 (FIG. 5A), to derive the interpolated pixel value for the current pixel.

If at decision block 516 it is determined that at least one of the adjacent pixel locations exhibits significant motion, then decision block 524 (FIG. 5B) follows decision block 516. At decision block 524, it is determined whether there is low motion/no motion at the left-hand neighboring pixel location (i.e., the absolute value of the difference between H and L is less than the threshold). If such is the case (which implies, in view of decision block 516, that the absolute value of the difference between J and N is not less than the threshold), then a set of pixels neighboring the left-hand neighbor in space and time may be selected, as indicated at 526. For example, the pixel values A, D, G and H may be selected at 526. The set of pixel values selected at 526 are then provided as inputs to the median function 520 to generate the "provisional" pixel value, which is included with B and E as the inputs for the subsequent application of the median function at 510 (FIG. 5A) to derive the interpolated pixel value for the current pixel.

If at decision block 524 it is determined that there is significant motion at the left-hand neighboring pixel location, then decision block 528 follows decision block 524. At decision block 528, it is determined whether there is low motion/no motion at the right-hand neighboring pixel location (i.e., the absolute value of the difference between J and N is less than the threshold). If such is the case, then a set of pixels neighboring the right-hand neighbor in space and time may be selected, as indicated at 530. For example, the pixel values C, F, J and K may be selected at 530. The set of pixel values selected at 530 are then provided as inputs to the median function 520 to generate the "provisional" pixel value, which is included with B and E as the inputs for the subsequent application of the median function at 510 (FIG. 5A) to derive the interpolated pixel value for the current pixel.

If at decision block 528 it is determined that there is significant motion at the right-hand neighboring pixel location, then the six neighboring current field pixel values A, B, C, D, E and F are selected (as indicated at 532) to be provided as inputs to the median function 520 to generate the "provisional" pixel. The latter may be included with B and E as the inputs for the subsequent application of the median function at 510 to derive the interpolated pixel value for the current pixel.

It will be appreciated that the process of FIGS. 5A-5B may be applied for most or all of the pixels to be interpolated to de-interlace the current field.

A de-interlacing process such as that illustrated in FIGS. 5A-5B may provide improved image quality as compared to at least some previously proposed de-interlacing techniques.

Figure 6:
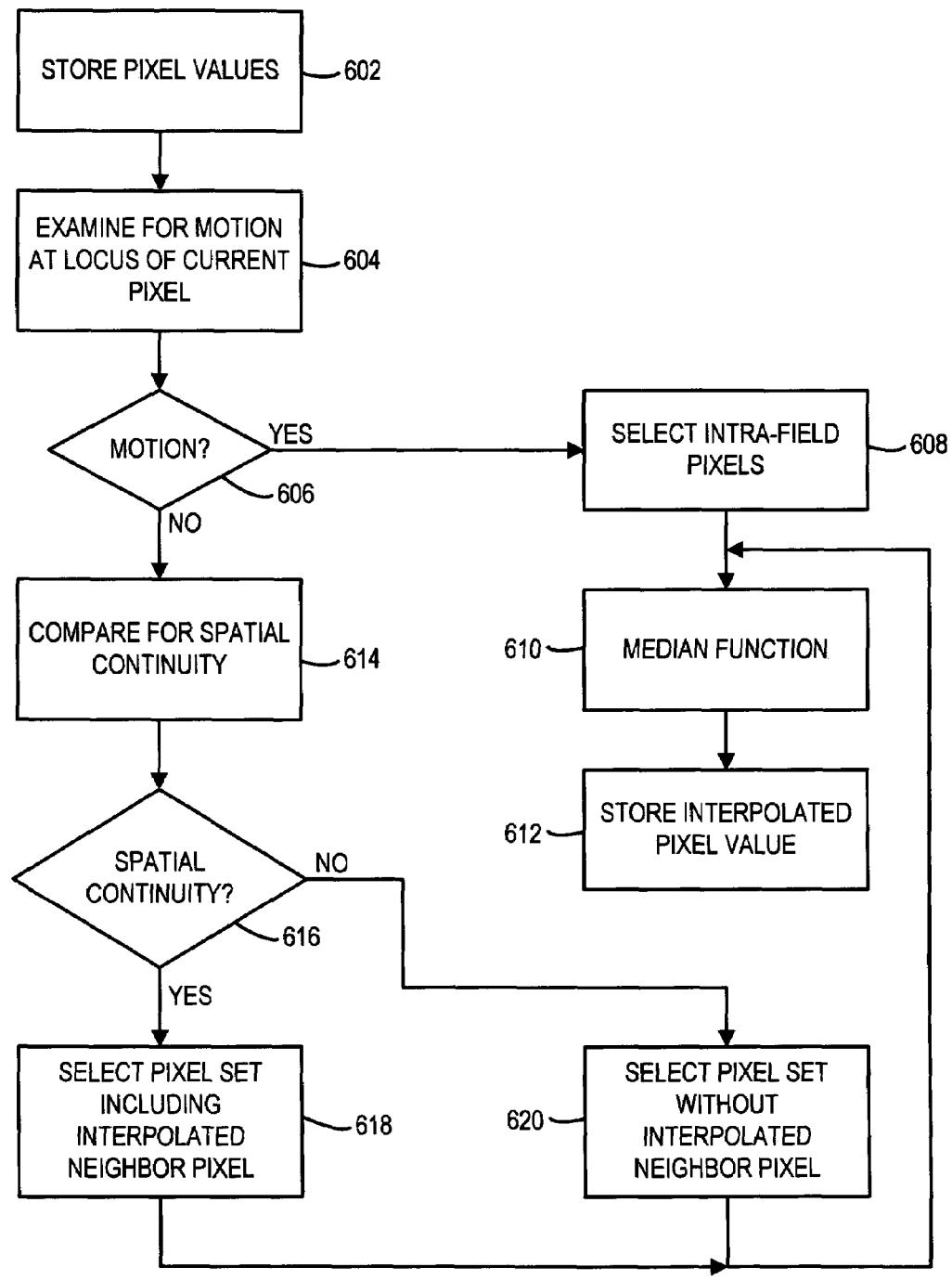
FIG. 6 is a flow chart that illustrates a de-interlacing process provided according to some other embodiments.

FIG. 6 is a flow chart that illustrates a de-interlacing process provided according to some other embodiments. In the embodiment of FIG. 6, pixels G, H, J, K, L, M and N are not used or taken into consideration, but the interpolated pixel value W (underlined with a dotted line), which is generated by the de-interlacing process of FIG. 6 for the current field and immediately precedes the current pixel in the current line, may be used and/or considered.

The process of FIG. 6 begins at 602, at which the necessary input pixel values are stored, as in 502 of FIG. 5A. Then, at 604, the preceding and succeeding fields are examined at the locus of the current pixel to determine whether there is motion in the video signal at that locus. This may be done in the same manner as 504 in FIG. 5A, by e.g. comparing the absolute value of the difference between pixel values I and M with a threshold.

At decision block 606 it is determined whether there is significant motion at the locus of the current pixel (i.e., whether the motion, if any, is not less than the threshold). If significant motion is found to be present, then (as indicated at 608) a set of nearest neighbor pixels from the current field is selected. For example, pixel values A, B, C, D, E and F are selected. The set of pixel values selected at 608 are then provided as inputs to a median function (610 in FIG. 6), which outputs the median value of the set of selected pixel values. The output median value is considered to be the interpolated value of the current pixel, and stored as such, as indicated at 612.

If it is determined at 606 that any motion at the locus of the current pixel is less than the threshold, then (as indicated at 614) the absolute value of the difference between pixels I and W is compared with the absolute value of the difference between pixels I and E to determine whether there is spatial continuity along the current line.

At decision block 616, it is determined whether spatial continuity along the current line is found. If so (i.e., if the absolute value of the difference between pixels I and W is less than the absolute value of the difference between pixels I and E), then pixels I, E and W are selected (as indicated at 618) to be the inputs to the median function 610, to derive the interpolated pixel value for the current pixel. If not (i.e., if the absolute value of the difference between pixels I and W is not less than the absolute value of the difference between pixels I and E), then pixels I, B and E are selected (as indicated at 620) to be the inputs to the median function 610, to derive the interpolated pixel value for the current pixel.

In alternative embodiments, pixel B may be used in place of pixel E for the purposes of stages 614-616. In addition or alternatively, pixel M may be used in place of pixel I for the purposes of stages 614-616.

It will be appreciated that the process of FIG. 6 may be applied for most or all of the pixels to be interpolated to de-interlace the current field.

The de-interlacing process illustrated in FIG. 6 may result in satisfactory image quality. The process of FIG. 6 may not be as advantageous as the process of FIGS. 5A-5B, in that the process of FIG. 6 may entail recursive processing.

For either or both of the de-interlacing processes described above, sharpness enhancement processing may be applied (e.g., in a pipelined manner) to the de-interlaced image signal. For example, three-line vertical low pass filtering may be applied followed by a 3×3 peaking kernel.

Figure 7:
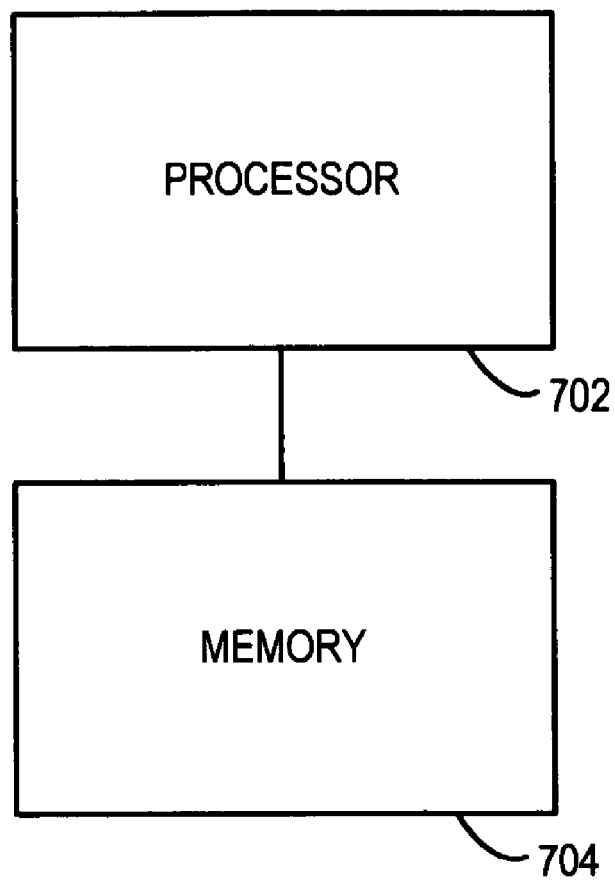
FIG. 7 is a block diagram of an alternative embodiment of the de-interlacing component of the apparatus of FIG. 1.

In some embodiments, the de-interlacing process block may be implemented in the form of application-specific integrated circuitry, as exemplified by the circuit configuration shown in FIG. 2. In other embodiments, the de-interlacing process block may be constituted at least in part by a processor 702 (FIG. 7) coupled to a memory 704. The processor 702 may be, for example, a general purpose microprocessor or digital signal processor or other programmable processor. The memory 704 may store software instructions to control the processor 702 to perform one of the de-interlacing processes described above, and may also serve as working memory and/or input and/or output digital video signal storage memory.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising:

storing a current field of a digital video signal;

storing a preceding field that immediately precedes the current field in the digital video signal;

storing a succeeding field that immediately succeeds the current field in the digital video signal;

examining the preceding and succeeding fields for motion at a locus of a current pixel to be interpolated;

if any motion at said locus is less than a threshold, examining the preceding and succeeding fields for motion at a respective locus of at least one pixel that is adjacent to said current pixel to be interpolated;

selecting at least one pixel value based at least in part on a result of said examining the preceding and succeeding fields for motion at said respective locus of said at least one pixel; and using said selected at least one pixel value to determine an interpolated pixel value for said current pixel value to be interpolated.

2. The method of claim 1, wherein said selected at least one pixel value includes at least one pixel value from said current field.

3. The method of claim 1, wherein said selected at least one pixel value includes at least one pixel value from said preceding field and at least one pixel value from said succeeding field.

4. The method of claim 3, wherein said selected at least one pixel value includes at least one pixel value from said current field.

5. The method of claim 1, wherein said at least one pixel value includes at least three pixel values, and said using said pixel values includes applying a median function to said pixel values.

6. A method comprising:
   storing fourteen pixel values, including:
   (a) a second pixel value which is in a current video signal field and corresponds to a pixel location that is immediately above a location of a current pixel to be interpolated;
   (b) a first pixel value which is in the current video signal field and corresponds to a pixel location immediately to the left of the location of the second pixel value;
   (c) a third pixel value which is in the current video signal field and corresponds to a pixel location immediately to the right of the location of the second pixel value;
   (d) a fifth pixel value which is in the current video signal field and corresponds to a pixel location immediately below the location of the current pixel to be interpolated;
   (e) a fourth pixel value which is in the current video signal field and corresponds to a pixel location immediately to the left of the location of the fifth pixel value;
   (f) a sixth pixel value which is in the current video signal field and corresponds to a pixel location immediately to the right of the location of the fifth pixel value;
   (g) a ninth pixel value which is in a preceding video signal field which immediately precedes said current video signal field, said ninth pixel value corresponding in location to said current pixel to be interpolated;
   (h) an eighth pixel value which is in the preceding video signal field and which corresponds to a pixel location immediately to the left of the location of the ninth pixel value;
   (i) a seventh pixel value which is in the preceding video signal field and which corresponds to a pixel location immediately to the left of the location of the eighth pixel value;
   (j) a tenth pixel value which is in the preceding video signal field and which corresponds to a pixel location immediately to the right of the location of the ninth pixel value;
   (k) an eleventh pixel value which is in the preceding video signal field and which corresponds to a pixel location immediately to the right of the location of the tenth pixel value;
   (l) a thirteenth pixel value which is in a succeeding video signal field which immediately succeeds said current video signal field, said thirteenth pixel value corresponding in location to said current pixel to be interpolated;
   (m) a twelfth pixel value which is in the succeeding video signal field and which corresponds to a pixel location immediately to the left of the location of the thirteenth pixel value; and
   (n) a fourteenth pixel value which is in the succeeding video signal field and which corresponds to a pixel location immediately to the right of the location of the thirteenth pixel value;
   deriving an interpolated value of said current pixel to be interpolated from application of a median function to said first through six stored pixel values if an absolute value of a difference between said ninth and thirteenth stored pixel values exceeds or is equal to a first threshold;
   deriving the interpolated value of said current pixel to be interpolated from application of said median function to a provisional pixel value, said second stored pixel value and said fifth stored pixel value if the absolute value of the difference between said ninth and thirteenth stored pixel values is less than said first threshold;
   deriving said provisional pixel value from application of the median function to said second, fifth, ninth and thirteenth stored pixel values if an absolute value of a difference between said eighth and twelfth stored pixel values is less than a second threshold and an absolute value of a difference between said tenth and fourteenth stored pixel values is less than a third threshold;
   deriving said provisional pixel value from application of said median function to said first, fourth, seventh and eighth stored pixel values if said absolute value of said difference between said eighth and twelfth pixel values is less than said second threshold and said absolute value of said difference between said tenth and fourteenth pixel values is not less than said third threshold;
   deriving said provisional pixel value from application of said median function to said third, sixth, tenth and eleventh stored pixel values if said absolute value of said difference between said eighth and twelfth stored pixel values is not less than said second threshold and said absolute value of said difference between said tenth and fourteenth stored pixel values is less than said third threshold; and
   deriving said provisional pixel value from application of said median function to said first through sixth stored pixel values if said absolute value of said difference between said eighth and twelfth stored pixel values is not less than said second threshold and said absolute value of said difference between said tenth and fourteenth stored pixel values is not less than said third threshold.

7. The method of claim 6, wherein all of said first, second and third thresholds are equal to each other.

8. The method of claim 7, wherein said pixel values are defined within a range of 0-255, and said first, second and third thresholds are equal to ten.

9. The method of claim 7, wherein said first, second and third thresholds are substantially one-twenty-fifth of a range within which said pixel values are defined.

10. An apparatus comprising:
   a storage medium having stored thereon instructions that when executed by a machine result in the following:
      storing a current field of a digital video signal;
      storing a preceding field that immediately precedes the current field in the digital video signal;
      storing a succeeding field that immediately succeeds the current field in the digital video signal;

examining the preceding and succeeding fields for motion at a locus of a current pixel to be interpolated;
if any motion at said locus is less than a threshold, examining the preceding and succeeding fields for motion at a respective locus of at least one pixel that is adjacent to said current pixel to be interpolated;
selecting at least one pixel value based at least in part on a result of said examining the preceding and succeeding fields for motion at said respective locus of said at least one pixel; and
using said selected at least one pixel value to determine an interpolated pixel value for said current pixel value to be interpolated.

11. The apparatus of claim 10, wherein said selected at least one pixel value includes at least one pixel value from said current field, at least one pixel value from said preceding field, and at least one pixel value from said succeeding field.

12. A method comprising:
storing a current field of a digital video signal;
storing a preceding field that immediately precedes the current field in the digital video signal;
storing a succeeding field that immediately succeeds the current field in the digital video signal;
examining the preceding and succeeding fields for motion at a locus of a current pixel to be interpolated; and
comparing a first difference between a pixel value in one of said preceding and succeeding fields and an interpolated pixel value for said current field for a pixel location immediately to the left of said current pixel to be interpolated with a second difference between said pixel value in one of said preceding and succeeding fields and a pixel value in said current field for a pixel location that is either immediately above or immediately below said current pixel to be interpolated.

13. The method of claim 12, further comprising:
if any motion at said locus is not less than the threshold, deriving an interpolated value of said current pixel to be interpolated from application of a median function to six pixel values of said current field, a first three of said six pixel values corresponding to pixel locations in a horizontal line above said current pixel to be interpolated and a second three of said six pixel values corresponding to pixel locations in a horizontal line below said current pixel to be interpolated;
if any motion at said locus is less than the threshold and the first difference is less than the second difference, deriving an interpolated value of said current pixel to be interpolated from application of the median function to said pixel value in said one of said preceding and succeeding fields, said interpolated pixel value for said pixel location immediately to the left of said current pixel to be interpolated and said pixel value in said current field for a pixel location that is either immediately above or immediately below said current pixel to be interpolated; and
if any motion at said locus is less than the threshold and the first difference is not less than the second difference, deriving an interpolated value of said current pixel to be interpolated from application of the median function to said pixel value in said one of said preceding and succeeding fields, a pixel value in said current field which corresponds to a pixel location immediately above said current pixel to be interpolated, and a pixel value in said current field which corresponds to a pixel location immediately below said current pixel to be interpolated.

14. The method of claim 12, wherein:
said pixel value in one of said preceding and succeeding fields is a pixel value in said preceding field at said locus of said current pixel to be interpolated;
said pixel value in said current field for a pixel location that is either immediately above or immediately below said current pixel to be interpolated is said pixel value in said current field which corresponds to said pixel location that is immediately below said current pixel to be interpolated;
said first three of said six pixel values correspond to a pixel location immediately above said current pixel to be interpolated and pixel locations immediately to the left and right of said pixel location immediately above said current pixel to be interpolated; and
said second three of said six pixel values correspond to a pixel location immediately below said current pixel to be interpolated and pixel locations immediately to the left and right of said pixel location immediately below said current pixel to be interpolated.

15. A system comprising:
a tuner; and
a de-interlacing circuit coupled to the tuner and operative to:
store a current field of a digital video signal;
store a preceding field that immediately precedes the current field in the digital video signal;
store a succeeding field that immediately succeeds the current field in the digital video signal;
examine the preceding and succeeding fields for motion at a locus of a current pixel to be interpolated;
if any motion at said locus is less than a threshold, examine the preceding and succeeding fields for motion at a respective locus of at least one pixel that is adjacent to said current pixel to be interpolated;
select at least one pixel value based at least in part on a result of said examining the preceding and succeeding fields for motion at said respective locus of said at least one pixel; and
use said selected at least one pixel value to determine an interpolated pixel value for said current pixel value to be interpolated.

16. The method of claim 1, wherein said at least one pixel includes:
(a) a first adjacent pixel that immediately precedes said current pixel in a horizontal line that includes said current pixel; and
(b) a second adjacent pixel that immediately succeeds said current pixel in said horizontal line.

17. The apparatus of claim 10, wherein said at least one pixel includes:
(a) a first adjacent pixel that immediately precedes said current pixel in a horizontal line that includes said current pixel; and
(b) a second adjacent pixel that immediately succeeds said current pixel in said horizontal line.

18. The system of claim 15, wherein said at least one pixel includes:
(a) a first adjacent pixel that immediately precedes said current pixel in a horizontal line that includes said current pixel; and
(b) a second adjacent pixel that immediately succeeds said current pixel in said horizontal line.

* * * * *